S. D. HENDERSHOT.
CENTERING DEVICE.
APPLICATION FILED AUG. 3, 1920.
1,390,906.
Patented Sept. 13, 1921.
2 SHEETS—SHEET 1.
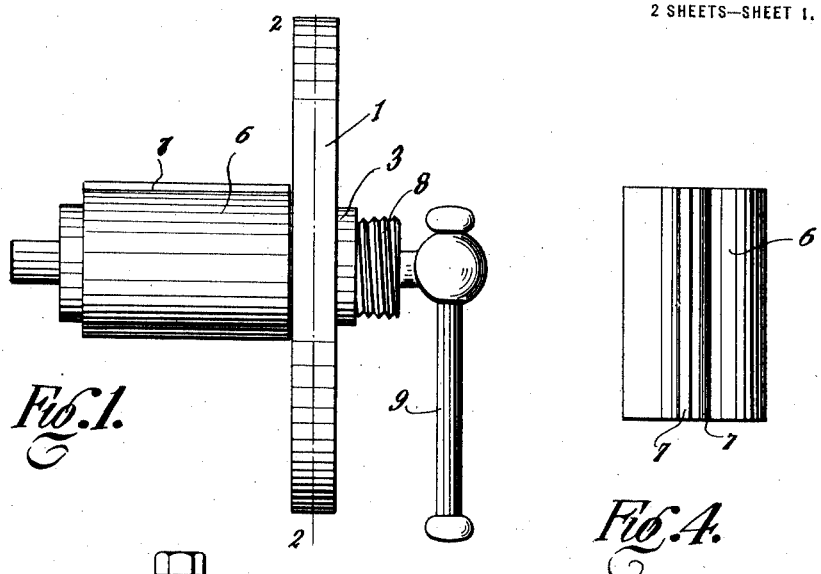
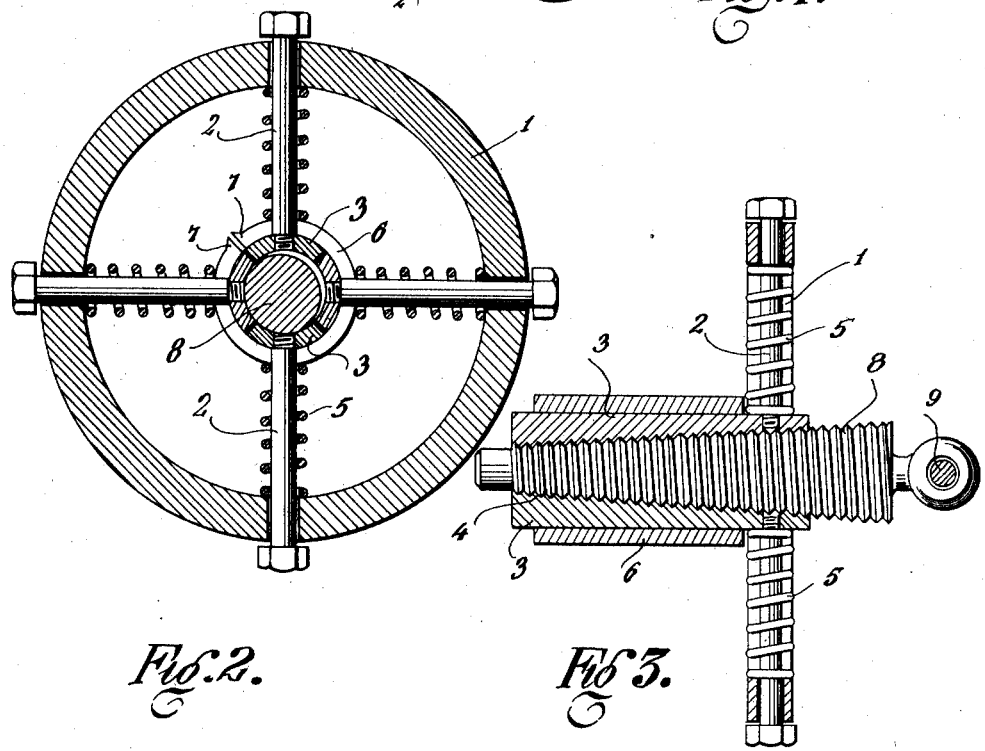
S. D. Hendershot
INVENTOR
BY Victor J. Evans
ATTORNEY
WITNESS:

S. D. HENDERSHOT.
CENTERING DEVICE.
APPLICATION FILED AUG. 3, 1920.
1,390,906.
Patented Sept. 13, 1921.
2 SHEETS—SHEET 2.
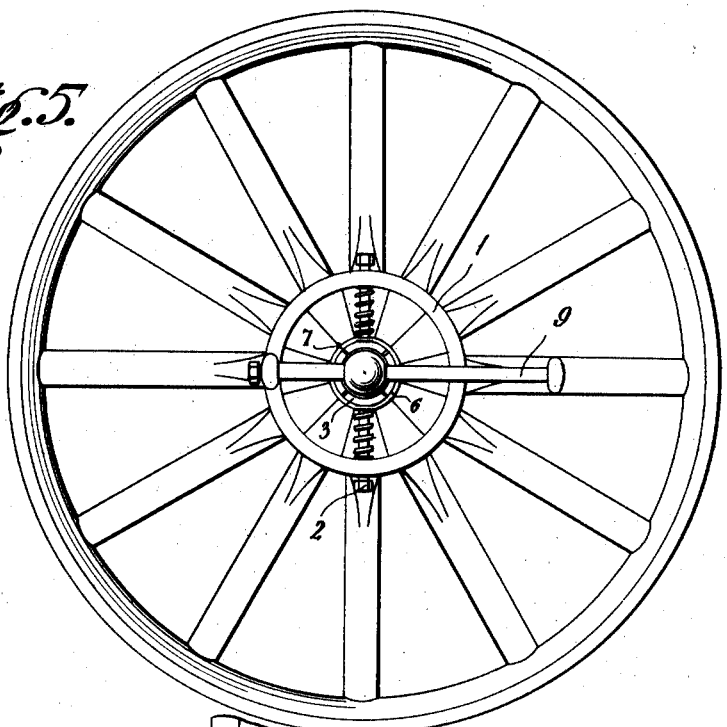
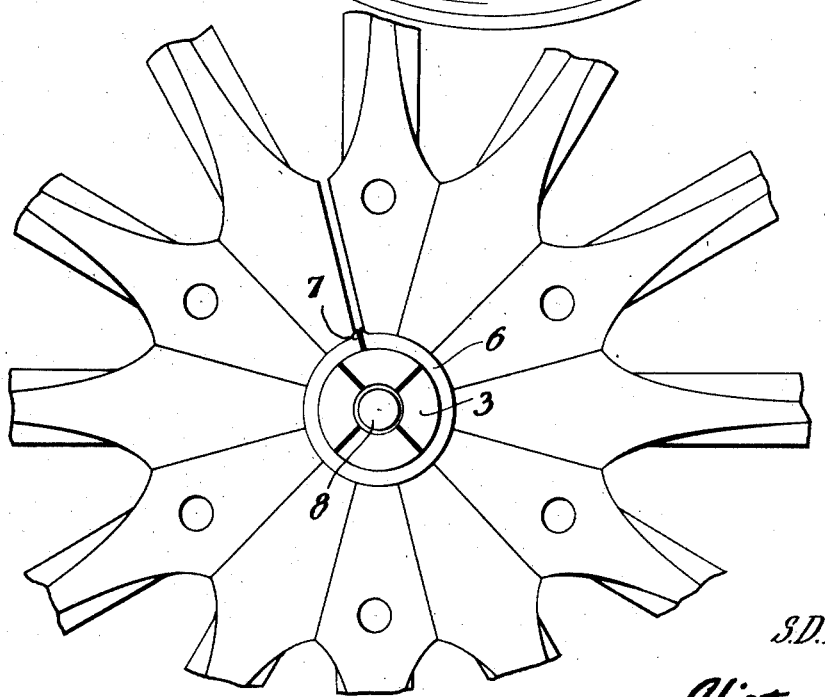

UNITED STATES PATENT OFFICE.

SAMUEL D. HENDERSHOT, OF INDEPENDENCE, CALIFORNIA.

CENTERING DEVICE.

1,390,906.  Specification of Letters Patent.  Patented Sept. 13, 1921.

Application filed August 3, 1920. Serial No. 401,022.

*To all whom it may concern:*

Be it known that I, SAMUEL D. HENDERSHOT, a citizen of the United States, residing at Independence, in the county of Inyo and State of California, have invented new and useful Improvements in Centering Devices, of which the following is a specification.

This invention relates to means for tightening automobile wheels and the principal object of the invention is to provide means for expanding a wheel so that a shim may be placed between a pair of the spokes to hold the wheel in expanded condition and thus firmly hold the rim in place.

Another object of the invention is to so form the device that it may be used in different sizes of wheels.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side view of the device.

Fig. 2 is a section on line 2—2 of Fig. 1.

Fig. 3 is a longitudinal sectional view through the device.

Fig. 4 is a view of the sleeve.

Figs. 5 and 6 are views showing the device in place in a wheel.

In these views 1 indicates a supporting member of ring shape and 2 are bolts slidably carried by said member and radially arranged therein. 3 indicates the hub member which is formed of four segmental pieces, each of which is secured to the inner end of one of the bolts. This hub member is provided with a tapered screw threaded bore 4. A spring 5 is carried by each bolt and this spring has its inner end resting against one quarter of the hub and its other end against the ring members so that the springs tend to hold the hub sections in engagement with each other. As will be seen each hub section is of considerable length and the bolts are connected with the sections adjacent their front end. A split sleeve 6 is adapted to surround the said hub and the split ends of said sleeve are bent outwardly to provide flanges 7. A tapered screw threaded member 8 is adapted to engage with the screw threaded bore of the hub for expanding the sections thereof. This member is provided with a handle 9 for turning the same.

In using the device the hub of the wheel is removed and the hub 3 with the sleeve thereon is inserted in the opening formerly occupied by the hub. The screw threaded member 8 is then inserted in the bore and said member turned to expand the hub sections against the ends of the spokes to force the spokes outwardly. The flanges 7 on the split sleeve are placed at the junction of a pair of the spokes and when the sleeve is expanded these flanges will force the two spokes apart to provide a space for receiving a shim which is driven between the two spokes. The member 8 is then withdrawn from the hub 3 to permit said hub to contract so that the device can be withdrawn from the wheel: In this way the wheel is tightened without requiring the taking off of the rim and placing a filler between the felly and rim.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. An expanding device of the class described comprising a hub member formed of sections, a supporting member of ring-shape, bolts slidably mounted therein and having their inner ends connected with the hub sections, springs on the bolts and arranged between the supporting member and the hub sections for holding the hub member in contracted condition and means for expanding the sections.

2. An expanding device of the class described comprising a hub member formed in sections, a ring member, bolts slidably mounted therein, and having their inner ends connected with the hub sections, springs surrounding the bolt for holding the hub sections in contracted condition, means for expanding the hub member and a split sleeve surrounding the hub member and having outwardly extending flanges at its split ends.

In testimony whereof I affix my signature.

SAMUEL D. HENDERSHOT.